UNITED STATES PATENT OFFICE.

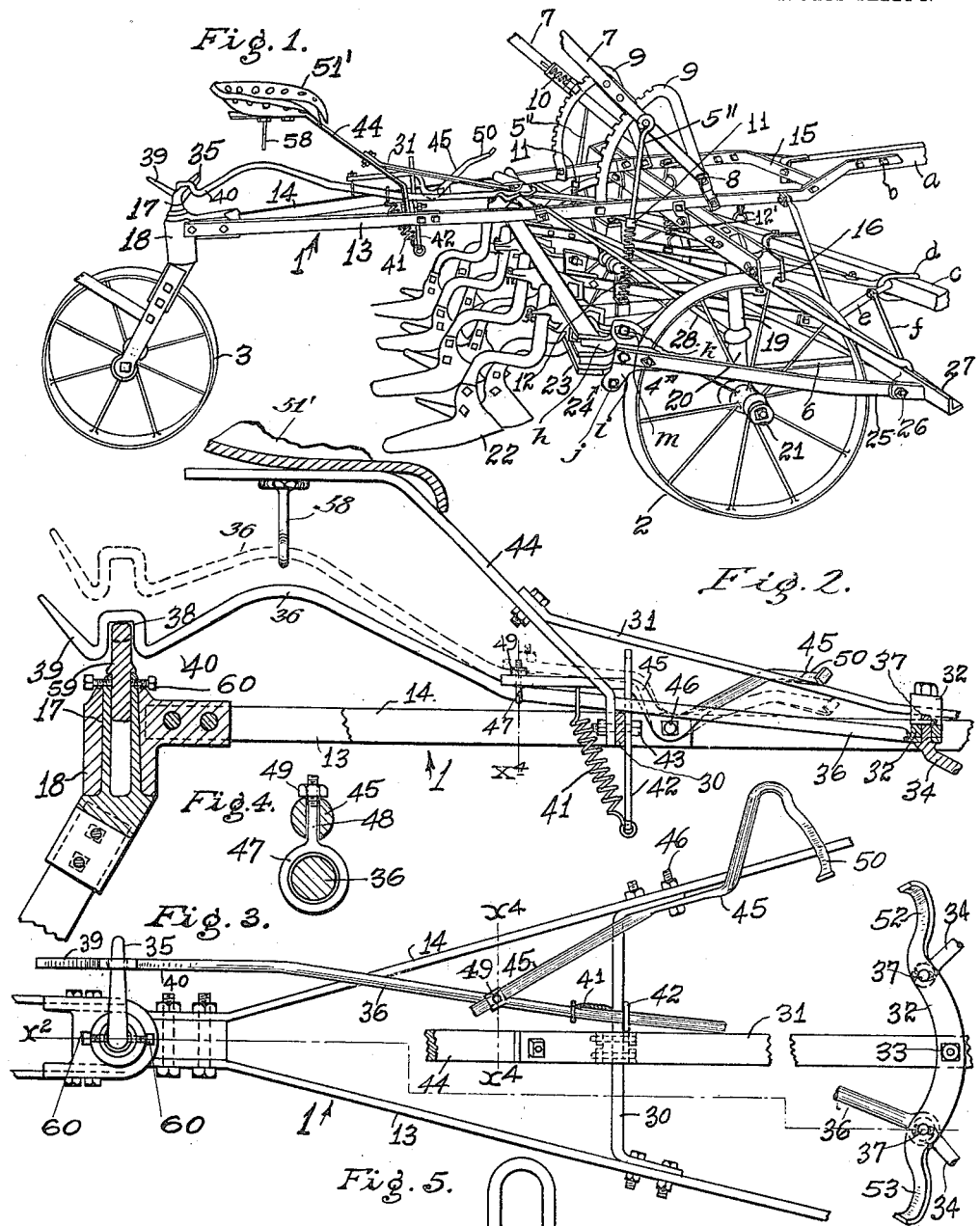

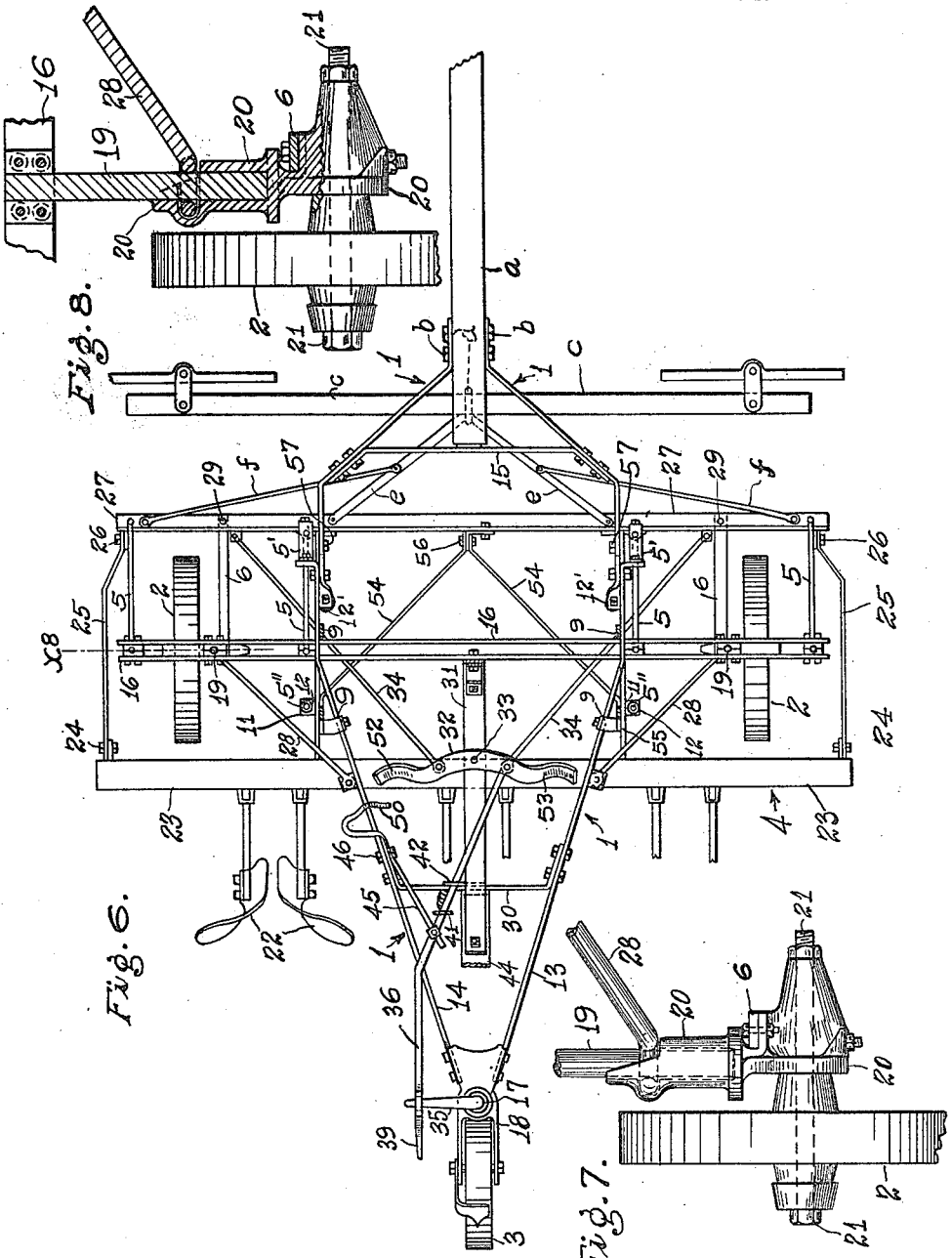

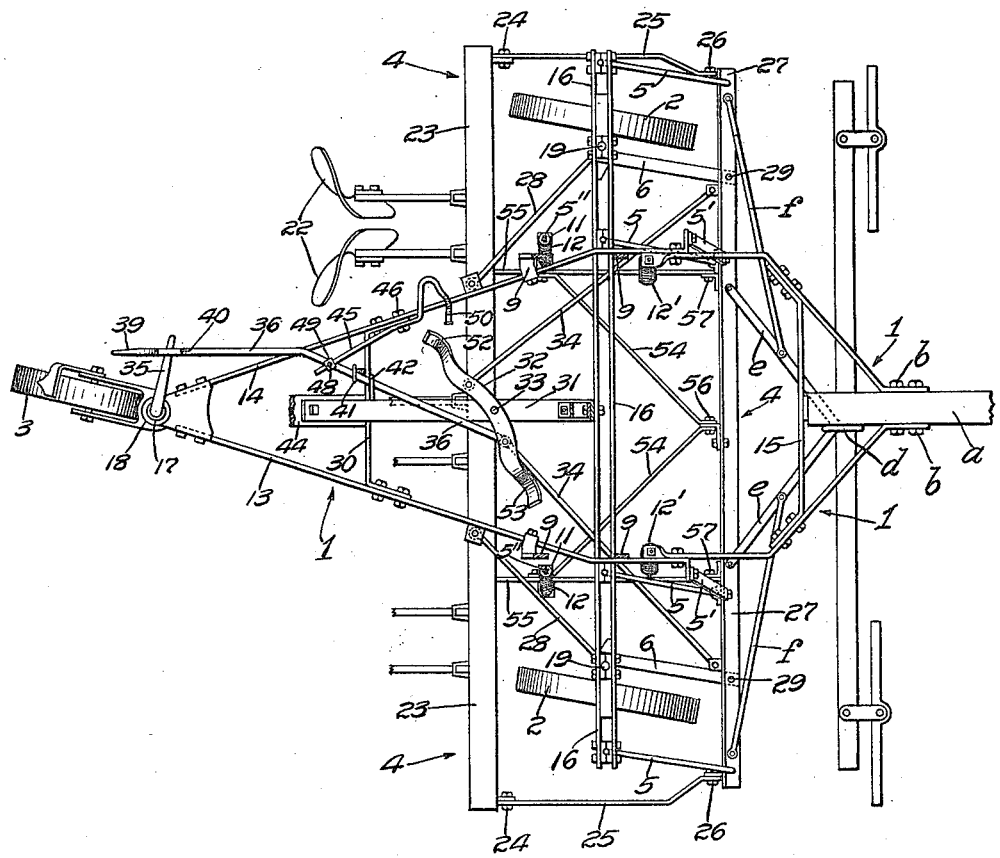

JAMES R. SHAW, OF NORWALK, CALIFORNIA.

DIRIGIBLE CULTIVATOR.

1,068,369. Specification of Letters Patent. Patented July 22, 1913.

Application filed June 24, 1911. Serial No. 635,180.

*To all whom it may concern:*

Be it known that I, JAMES R. SHAW, a citizen of the United States, residing at Norwalk, in the county of Los Angeles and State of California, have invented new and useful Improvements in Dirigible Cultivators, of which the following is a specification.

This invention relates to that class of implements designed for use in cultivating fields having rows of plants, and is more particularly designed for cultivating beet fields and the like.

It is customary to plant beets in rows by means of a planter having a plurality of drills preferably four in number, so that four rows are planted simultaneously in driving the planter across the field and such rows are in parallelism with each other; and the cultivator for cultivating the field thus planted is also provided with blades or cutters, as hoes or sweeps, chisels, and duckfeet used at different stages of growth of the beets, and said cutters are arranged for simultaneously cultivating between and on each side of the four rows thus planted; the planter and cultivator being standardized so that in cultivating the field, the machine will at each operation cultivate the four rows that were simultaneously planted. Such rows are not always straight and at any jog in the rows it is necessary for the attendant to be able to shift the cultivator blades laterally to avoid cutting the plants at the jog. The greater the accuracy with which the guiding of the cultivator blades can be accomplished the greater will be the efficiency of the work for the reason that the blades may be adjusted to cultivate with safety very close to the beets.

In some cultivators steering is accomplished by mounting the front wheels of the cultivator on stub axles connected with levers operated by foot to turn said front wheels. In others the cultivator blades are carried by a swinging frame which can simultaneously shift the blades from side to side. In others the wheel and frame steering features are combined, so that the blades are shifted by levers which simultaneously turn the stub axles and correspondingly shift the frame.

An object of this invention is to provide a cultivator that can be guided with maximum facility, ease and accuracy and in which the blades can be instantly shifted laterally so as to miss the beets or other plants that are out of line and to conform the path of the cultivator blades to the line of the rows being cultivated.

A further object is to provide an attachment that may be quickly, cheaply and conveniently applied to a standard cultivator and be used to control the rear swivel wheel in conformity to the movements of the front stub axles and also to the lateral movements of the blades.

A further object is to provide a device that will enable the operator of the cultivator or other machine to which the same is attached, to make a very sharp turn when coming out of one series of rows of plants and going back into another series and which may be instantly adjusted to and from position for free road travel and for steering travel.

The invention is adaptable to various kinds of cultivators and implements designed to be moved along one or more rows of a field being planted or cultivated, and may be constructed in various different ways so that the operator can control the tiller wheel with his feet, thus leaving the hands free for driving the team and for operating the levers.

The invention includes the parts and combinations of parts more particularly set forth in the subjoined detail description.

The accompanying drawings illustrate the invention.

Figure 1 is a perspective view of a cultivator constructed in accordance with this invention; the same including a common cultivator with my attachment applied thereto. The parts are shown in the straight away position. Fig. 2 is a sectional elevation from line $x^2$—$x^2$, Fig. 3. Dotted lines indicate the position of the latch when hung upon the latch-supporting-hook, a fragment of which is shown together with the seat standard in this view. Fig. 3 is a fragmental plan detail of parts of the attachment and parts of the cultivator frame. Fig. 4 is an enlarged cross-sectional detail of the connection between parts of the attachment. Line $x^4$, Figs. 2 and 3 indicate the line of section. Fig. 5 is an elevation of the latch guide and spring holder, detached. Fig. 6 is a plan of the cultivator shown in Fig. 1; parts of the machine being shown in normal position and some of the sweeps and parts of their shanks being broken away to avoid confusion of lines. Fig. 7 is a fragmental rear elevation of one of the front steering wheels. Fig. 8 is a detail partly in section on line $x^8$, Fig. 6, of one of the front steering wheels. Fig. 9 is a plan view of the machine shown in Fig. 1; the parts being shown as when the wheels are angled instead of in the straight away position.

The cultivator comprises a main frame 1, the front steering wheels 2 and a rear tiller wheel 3 which are swiveled to and support the main frame 1. The sweep frame 4 is swung from the main frame 1 by hanger links 5, 5' and 5" and is connected with the steering wheels 2 by steering arms 6 pivoted to the sweep frame 4. The links 5" are connected to the rear of the sweep frame and are movable up and down by handles 7 that are pivoted at 8 to segments 9 that are fixed on the main frame 1; said handles being adjustably held by latches 10 that engage said segments. The links 5 and 5' are connected with the front of the sweep frame, which frame is thus suspended to oscillate or swing laterally. The tongue $a$ is connected to the main frame 1 by bolts $b$ and the sweep frame 4 is drawn by the double-tree $c$ connected thereto by the clevis $d$, draw bar $e$ and stay links $f$. Thus the main frame is supported by the wheels and is rigid with the tongue and the sweep frame is swung from the main frame and drawn by the double-tree. The team guides the tongue and this gives a general direction to the main frame and it draws the sweep frame by the double-trees which may be swung to one side or the other relative to the main frame and tongue. The rear links 5" are provided with blocks 11 to engage springs 12 that rest upon the sweep frame to yieldingly hold the rear portion thereof down responsive to the position given to the handles. The springs 12' connected to the main frame 1, and extending downwardly to the sweep frame 4, are provided to assist the springs 12 in raising and lowering the sweep frame.

The main frame comprises the rearwardly converging side bars 13, 14, connected at the front by the cross bar 15 and rigidly fixed to the main cross-beam 16. The tubular swivel post 17 of the tiller wheel 3 is journaled in the box 18 fixed to the rear end of the main frame 1, and the posts 19 of the steering wheels are fixed to the main cross-beam 16; the swivel sleeves 20 of the steering wheels being journaled on the posts 19 and fixed to the stub axles 21 of the front wheels 2. The sweeps 22, are carried by the sweep beam 23 which is fixed by the adjustable joint 24 to side bars 25 that are hinged by the horizontal pins 26 to the front bar 27 of the sweep frame which thus comprises the rear beam 23, the side bars 25 and the front beam 27. The front hanger links 5, 5' are connected to the front sweep beam 27. The adjustable joints 24 are of a well known form and each comprises a bracket $h$ fixed to and projecting forwardly from the sweep beam 23, and above and below the side bar 25; a bracket $i$ fixed to a side bar 25, and projecting above and below such side bar; a pivot bolt $j$ pivoting the brackets together at their lower portions, and a clamp bolt $k$ fixed to the upper projections of one of the brackets and extending through a slot $m$ in the upper projection of the other bracket so that by loosening the nuts of the bolts the side bars 25 may be swung up or down on the pivot bolts $j$ thus to turn the sweep beam 23 on its axis in one or the other direction to make the shares run level at any determined depth. When the side bars are properly set the bolts are then tightened to hold the joint rigid in the set position. The joining faces of the brackets may be corrugated to prevent slipping. The steering posts 19 are held rigid by braces 28 fixed to the side bars 13 and 14 of the main frame. The guide arms 6 are pivotally connected by pins 29 to the front sweep beam 27, so that when the sweep frame is swung sidewise, the wheels 2 will be turned on the steering wheel posts 19.

A seat support 30 is fixed to the side bars 13, 14, of the main frame rearwardly of the sweep frame and a brace 31 extends therefrom to the main beam 16 to which it is fixed. A steering foot lever 32 is pivoted by a pin 33 at its center to the brace 31 and is pivotally connected by means of connecting rods 34 on opposite sides of the pivot pin 33 with the front sweep beam 27. Said connecting rods 34 diverge forwardly from the foot lever 32 so that when the guiding foot lever is turned on its pivot 33, it will shift the sweep frame laterally thus shifting the sweeps, and also will act upon the arms 6 to turn the front steering wheels 2.

The construction hereinbefore particularly described is practically that of a common cultivator, and no claim is made herein to said construction.

In my improved cultivator the tiller post 17 is provided with a lateral tiller arm 35 and latch means are provided to detachably connect said tiller arm with that arm of the guiding lever 32, which is on the side of the machine opposite the tiller arm 35, so that when the guiding lever is turned on its pivot 33, thus turning the steering wheels in one direction, the same movement will turn the tiller wheel in the same direction. The connecting means between the tiller arm 35 and the guiding lever 32 is preferably a bent round rod forming latch 36 pivoted to the guiding lever 32 by a pin 37, which, in the construction shown, is formed on the upper end of one of the connecting rods 34. The rod forming said latch 36 is bent at its rear end to form a downwardly open notch 38 on the opposite sides of which the latch slants upward, both forwardly and rearwardly, thus forming tiller arm guides 39 and 40 so that the latch 36 when resting on the unlatched tiller arm 35 will be lifted by said arm as it approaches the notch, during the swivel movement of the tiller wheel. A spring 41 connecting the latch 36 to the lower end of the latch guide 42 serves to hold the latch down upon the tiller arm. Said latch guide is fixed to the seat support 30 by the bolts 43 which support the seat standards 44.

An unlatching lever 45 is pivoted on a horizontal pin formed by a bolt 46, to side bar 14 of the main frame and is pivotally connected to the latch 36 by means of an eye-bolt, the eye 47 of which encircles the latch 36; and the stem 48 of which eye-bolt extends through the latch lever 45 and is secured by a nut 49. The latch lever 45 is provided at its forward end with a foot piece 50, so that when it is desired to allow the tiller wheel to swivel freely as when turning the machine at the ends of the rows, the latch can be lifted out of engagement with the tiller arm by the operator or driver simply holding down the foot piece by one of his feet until the turn is made; whereupon he may release the latch lever and thus allow the latch to rest on the frame or on the tiller arm which will be engaged by the notch as soon as the machine has righted itself as the team is driven straight forward.

In practical use, the operator sitting upon the seat 51, 51' may place his feet on the foot pieces 52, 53 of the steering lever 32, and as the machine moves forward, the tiller wheel 3 will naturally come into parallelism with the steering wheel 2 which the driver will hold by means of the lever 32 normal to the main beam 16. When the tiller wheel 3 comes to such parallel position the tiller arm 35 will come into the latched position shown in solid lines in the several views.

The driver closely notes the rows which he cultivates and when the sweeps reach a jog in the rows, he will turn the steering lever by pressing upon the foot piece 52 or 53 as the case may be, thus shifting the sweep frame 4 laterally, and thereby turning the arm 6 and the wheels 2, as with the previous cultivators; but at the same time the latch 36 also turns the tiller arm 35, thereby turning the tiller wheel 3 in the same direction as the steering wheels 2, with the result that the whole machine instantly responds by a side movement corresponding to the lateral movement of the sweep frame. In this manner the sweeps are moved more quickly and more certainly and with a slighter movement of the steering lever than has heretofore been possible, and in addition to this, the movement is certain and accurate, the machine being held by the tiller wheel against any uncertain lateral movement. In this way the driver is enabled while driving the cultivator at a good speed to avoid cutting up plants that with the unimproved machine can only be escaped with great difficulty and by driving the cultivator very slowly.

By this improvement the cultivator is not subject to be shifted by any irregularities of the ground as was heretofore occasioned, as for instance, when the cultivator without this improvement is being driven on sidling or uneven ground, the tiller wheel will run toward the lower side of the sidling place, thus shifting the machine from a true course and consequently making it practically impossible to avoid cutting up the plants.

In the drawing the braces which connect the sweep beam 23 with the front beam 27 of the sweep frame are indicated by the characters 54 and 55. These braces are all fixed to the sweep beam and are hinged to the front beam 27 by horizontal pins 56, 57.

When the machine is to be driven along a road and the sweeps are raised out of contact with the ground it is desirable to allow the tiller wheel to run free and for this purpose a latch-supporting hook 58 is swung from the seat support 44 and the driver may lift the latch 36 and hang it up. When this is done the machine will follow the team freely; the main frame being drawn by the sweep frame and guided by the tongue so that it can be turned as on a pivot and may be handled with as great facility as could the common machine heretofore known.

The tiller arm 35 is detachably attached to the usual hollow tiller wheel post 17 by a stem 59 seated in the socket formed by said hollow post and fixed in relation to said post by means of set screws 60 screwed through the sides of said post.

By means of the attachment shown the present common cultivators can be transformed from their present wandering character to a machine that will practically perfectly respond to the guiding movements of the operator.

The attachment may be modified within the judgment of the constructor to apply to other forms of cultivators illustration of which is not necessary herein for full understanding of this invention.

I claim:

1. In a dirigible cultivator having a main frame, front steering wheels, a rear tiller wheel swiveled to and supporting the main frame, a sweep frame swung from the main frame and connected with the steering wheels to steer the same, and a steering lever pivoted to the main frame and connected to the sweep frame to shift it laterally to thereby guide the steering wheels; an arm connected with the tiller wheel, a latch connected with the steering lever and resting on and engaging with the tiller wheel arm to guide the tiller wheel in correspondence with the steering wheels, and means to lift the latch for disconnecting the tiller wheel and the lever.

2. The attachment set forth to be applied to dirigible cultivators of the character substantially described, and comprising a tiller post and a steering lever; said attachment comprising a tiller arm, means to fix the arm to the tiller post of the cultivator, a latch to engage said arm and means to connect the latch with the steering lever of said cultivator.

3. The attachment set forth to be applied to dirigible cultivators of the character substantially described, and comprising a frame, a tiller post, and a steering lever; said attachment comprising a tiller arm, means to fix the arm to the tiller post of the cultivator, a latch to engage said arm, means to connect the latch with the steering lever of said cultivator; a spring for the latch and means to connect the spring with the frame.

4. The attachment set forth to be applied to dirigible cultivators of the character substantially described, and comprising a tiller post, a steering lever, and a frame; said attachment comprising a tiller arm, means to fix the arm to the tiller post of the cultivator, a latch to engage said arm, means to connect the latch with the steering lever of said cultivator, an unlatching lever, means to pivot the unlatching lever to the cultivator frame, and means to pivotally connect the unlatching lever with the latch.

5. In a dirigible cultivator having a main frame, front steering wheels, a rear tiller wheel swiveled to and supporting the main frame, a sweep frame swung from the main frame and connected with the steering wheels to steer the same, and a steering lever pivoted to the main frame and connected to the sweep frame to shift it laterally to thereby guide the steering wheels; an arm connected with the tiller wheel, means to connect the steering lever with the tiller wheel arm to guide the same in correspondence with the steering wheels and a latch-lifting lever pivoted to the main frame and connected to lift the latch.

6. In a cultivator having a main frame, front steering wheels, a rear tiller wheel swiveled to and supporting the main frame, a sweep frame swung from the main frame and connected with the steering wheels to steer the same, and a steering lever pivoted to the main frame and connected to the sweep frame to shift it laterally to thereby guide the steering wheels; the combination of an arm connected with the tiller wheel, a latch connected to the steering lever and arranged to rest on and engage the tiller wheel arm to guide the same in correspondence with the steering wheels, and an unlatching lever pivoted to the main frame and connected with the latch to lift the same; said unlatching lever being provided with a foot-piece adjacent to the steering lever.

7. In a cultivator the combination with a main frame of front steering wheels and a rear tiller wheel, swiveled to and supporting the main frame; a sweep frame swung from the main frame and connected with the steering wheels to steer the same; an arm connected with the tiller wheel; a steering lever pivoted to the main frame and connected with the sweep frame to shift it laterally and thereby to guide the steering wheels; a latch to connect the steering lever with the tiller wheel arm to guide the same in correspondence with the steering wheels; a spring to yieldingly hold the latch in latching position; a lever pivoted to the main frame, and means connecting the lever with the latch and for disconnecting the tiller wheel and the latch.

8. In a cultivator the combination with a main frame of front steering wheels and a rear tiller wheel, swiveled to and supporting the main frame; a sweep frame swung from the main frame and connected with the steering wheels to steer the same; an arm connected with the tiller wheel; a steering lever pivoted to the main frame and connected with the sweep frame to shift it laterally thereby to guide the steering wheels; and automatic means to connect the steering lever with the tiller wheel arm to guide the tiller wheel in correspondence with the steering wheels; and an unlatching lever pivoted to the main frame and connected with the latch.

In testimony whereof, I have hereunto set my hand at Los Angeles, California, this 17th day of June, 1911.

JAMES R. SHAW.

In presence of—
  JAMES R. TOWNSEND,
  L. BELLE RICE.

Copies of this patent may be obtained for five cents each, by addressing the "Commissioner of Patents, Washington, D. C."